United States Patent [19]

Giddey et al.

[11] 4,446,166
[45] May 1, 1984

[54] CHOCOLATE COMPOSITION FOR THE PREPARATION OF HEAT-RESISTANT CHOCOLATE ARTICLES AND PROCESS FOR ITS PREPARATION

[75] Inventors: Claude Giddey, Geneva; Georges Dove, Carouge, both of Switzerland

[73] Assignee: Battelle Memorial Institute, Carouge, Switzerland

[21] Appl. No.: 476,396

[22] Filed: Mar. 17, 1983

Related U.S. Application Data

[63] Continuation of Ser. No. 229,729, Jan. 29, 1981, abandoned.

[30] Foreign Application Priority Data

Jan. 30, 1980 [CH] Switzerland ............................ 731/80

[51] Int. Cl.³ .............................................. A23G 1/00
[52] U.S. Cl. ..................................... 426/631; 426/660
[58] Field of Search ............... 426/631, 601, 602, 613, 426/659, 660, 321, 331, 584, 585

[56] References Cited

U.S. PATENT DOCUMENTS

| | | | |
|---|---|---|---|
| 3,223,532 | 12/1965 | Pinkalla et al. | 426/602 |
| 3,232,765 | 2/1966 | Rosenthal et al. | 426/602 |
| 3,638,553 | 2/1972 | Kreuter | 426/520 |
| 4,081,559 | 3/1978 | Jeffery et al. | 426/660 |

*Primary Examiner*—Raymond N. Jones
*Assistant Examiner*—Elizabeth J. Curtin
*Attorney, Agent, or Firm*—Finnegan, Henderson, Farabow, Garrett & Dunner

[57] ABSTRACT

A chocolate composition for use in the preparation of a heat-resistant chocolate article comprising a chocolate mass containing cocoa butter, sugar, milk solids and cocoa solids and, dispersed throughout the mass, from 2 to 10% by weight of the composition of a water-in-fat emulsion, at least a portion of the fat being in solid form.

17 Claims, No Drawings

CHOCOLATE COMPOSITION FOR THE PREPARATION OF HEAT-RESISTANT CHOCOLATE ARTICLES AND PROCESS FOR ITS PREPARATION

This application is a continuation of application Ser. No. 229,729, filed Jan. 29, 1981, now abandoned.

FIELD OF THE INVENTION

The present invention concerns the field of foodstuff articles, especially of chocolate which resists, without softening, summer temperatures or the heat of tropical countries. Such a chocolate is often called "tropicalized" chocolate.

An object of the present invention therefore is to provide a chocolate composition for use in the preparation of tropicalized chocolate articles and a method for its manufacture.

BACKGROUND OF THE ART

Ordinary chocolate is composed of fats or fatty substances (cocoa-butter) in which there are dispersed non fat products such as cocoa components (cellulosic substances, flavors, theobromine, etc..), sugars, proteins (that of milk, for instance). Besides, there can be present in chocolate also various ingredients (fruits, peeled almonds, hazelnuts, special aromas, etc..). Thus, the main phase of chocolate is constituted by fat bodies and its melting temperature is generally not high. This phase essentially comprises cocoa-butter (a mixture of stearyl, oleyl, palmityl and linoleyl glycerides )and it starts softening at 28° C. with consequent loss of strength of the whole mass of chocolate. This mass does not neatly "break", anymore and it tends to flow and sticks annoyingly to the wrapper. Furthermore, after cooling, there can form, on the surface of the chocolate growths of crystallized cocoa butter (blooming) which looks like mold.

One has sought to remedy such drawbacks in many ways. For instance, by selecting fats of higher melting points or, better, by methods mainly based on disrupting the continuous chocolate fatty phase in order to minimize the influence of the melting thereof on the overall softening of the mass of chocolate. Such breaking can be obtained by inceasing, in the mass, the content of hydrophilic substance.

HIGHLIGHTS OF THE PRIOR-ART

Swiss Pat. No. 410.607 (MARS) discloses a chocolate composition containing hydrophilic substances such as dextrose, maltose, inverted sugar, fructose, xylose, mannitol, sorbitol, etc.. When the chocolate articles have been cast with such a composition, they are thereafter exposed to a moist atmosphere whereby they absorb a certain quantity of water which causes a relative increase of the volume occupied by the hydrophilic substances and an improvement of the heat resistance of the chocolate.

In Swiss Pats. Nos. 399.891 and 489.211, there is disclosed a method which consists in incorporating amorphous sugars into a chocolate composition during manufacture. These sugars cause the formation in the mass, by thermal treatment, of a lattice which prevents collapse of the mass when the temperature exceeds the melting point of the fat bodies used in its preparation.

Furthermore, there is described in Swiss Pat. No. 409.603 the direct incorporation of water into a chocolate composition during its manufacture. This water, the quantity of which is about 5% relative to the composition, causes a rapid thickening thereof at the temperatures where it is, normally, still a liquid (about 30° C.). However, since it is no longer liquid it is not possible to use the composition to cast chocolate articles in molds. The composition must then be ground and the obtained powder is pressed into shape by compression molding. This process is a typical example of inverted structure, i.e. a case where the fats of the chocolate are practically all embedded within the matrix of the hydrophilic substances. One finds similar processes described in Swiss Pat. No. 405.908 and German Patent DRP No. 389.127.

According to U.S. Pat. No. 2,760,867, one can incorporate water into chocolate under manufacture by using, in addition, an emulsifier such as lecithin. Now, in U.S. Pat. No. 4,081,559, there is added to chocolate an amount of sugar such that, when the quantity of water required to obtain a tropicalized chocolate is added, there is formed an aqueous sugar solution in which at least one edible fat (of the chocolate) is emulsified.

According to another process described in Swiss Pat. No. 519.858, fat bodies are incorporated, into a chocolate composition, in the encapsulated state, i.e. within vesicles or microbeads having a diameter below 2 mm and made of a nonliposoluble edible envelope, which technique enables obtaining a heat resistant chocolate.

The methods of the prior-art are operative but they have, however, some drawbacks. They either require thermal treatments or storage under humid conditions for rather long periods which is uneconomical. Otherwise, they require the addition of unusual additives or they impart to the chocolate a coarser or rougher structure which is looked upon as a deficiency in quality.

DESCRIPTION OF THE INVENTION AND SOME EMBODIMENTS THEREOF

The present invention overcomes these defects because:

(a) it brings little or no change in the length of the chocolate manufacture;

(b) it introduces no particular substance normally foreign to the composition of the chocolate;

(c) the taste and feel of the chocolate articles thus obtained is, practically, not any different from that of similar articles obtained from a classical mass of chocolate containing the same ingredients in identical proportions.

The composition of chocolate according to the invention for the preparation of tropicalized chocolate articles, for instance by casting into molds or by coating chocolate articles, comprises, dispersed in its mass, particles consisting of an emulsion of a "water in fat". Generally, this fat, in solid or partly molten state, is cocoa-butter the main fraction of which constitutes the fat phase of the chocolate. However, other fats which may possibly be used in chocolate manufacture are also convenient. Indeed, when articles of chocolate are cast from this composition, the emulsion formed by partially or totally solid particles dispersed within the composition will eventually liberate the water trapped therein in the form of a suspension of very fine droplets, which water will generate, together with the hydrophilic solids of the composition, a kind of lattice enclosing the phase of fats. This liberation of the water droplets occurs when the particles of the "water in fat" emulsion are resorbed and vanish in the mass due to their being put in contact with the liquid warm chocolate undergoing solidification. When the temperature is thereafter raised, this network in the solidified chocolate prevents collapsing of the structure despite the melting of the fat phase. The above explanation given here is actually hypothetical because, up to now, no marked difference of taste and physical aspect has been found between the chocolate thus obtained and the same chocolate obtained by the classical route. A fundamental difference however exits: the softening temperature. Thus, although the chocolate obtained by the classical techniques markedly softens around 28° C. and melts at slightly higher temperatures, the same chocolate generated from the above-disclosed composition remains surprisingly stiff at 50° C. and even above. Strange enough, this difference of texture is hardly noticeable by taste and the chocolate thus tropicalized melts in the mouth nearly like ordinary chocolate. This is perhaps due to the fact that, during manufacture, the particles of the emulsion will act, at least in part, as normally expected from the cocoa-butter crystallites which form during tempering of the mass.

The method for manufacturing the composition of the invention is the following: a chocolate compositon is first prepared with usual ingredients according to usual means. This consists typically of mixing ingredients normally found in ordinary chocolate such as cocoa-butter, sugar, milk solids and cocoa solids in a Conge or other suitable mixing device capable of agitating or working the mixture and of providing aeration. The composition or chocolate mass obtained is often referred to as "conged" chocolate. See U.S. Pat. No. 2,760,867 at column 1, lines 33-41. Then, the conged chocolate can, or not, be subjected to tempering. In regard to tempering, this consists in generating within the liquid chocolate mass cocoa-butter "crystallization germs" or crystallites and this is achieved by temporarily lowering the temperature of the molten mass from about 30° C. to about 25°-27° C. under stirring. Then, according to one embodiment for implementing the invention, once the mass has been tempered and further brought up to 29°-31° C., there is added 2 to 10% by weight based on the total weight of the composition of an emulsion of water in cocoa-butter (1-4% by weight of water based on the total weight of the composition) of an emulsion of water in cocoa-butter, as described above, under vigorous stirring to ensure a homogeneous dispersion of the particles. The composition should be used to make a chocolate article before the emulsion particles containing the water have a chance to be destroyed by the agitation or by melting completely. According to another embodiment for achieving the method of the invention, it was noticed that it was not necessary that the conged chocolate mass be tempered beforehand to obtain the desired results. Indeed, it is sufficient to bring the mass to an appropriate temperature where cocoa-butter particles do not rapidly melt (o.e. are in fusion equilibrium with the liquid) and, at this temperature, to add the above-mentioned emulsion because at least some of the particles thereof act like the crystallization germs mentioned heretofore which normally result from the tempering operation. Naturally, also in this case, the composition must be made into a chocolate article rapidly before the particles of the partly solid emulsion have disintegrated due to melting to mechanical disruption within the agitated mass. Fortunately, such deterioration of the composition is not rapid because, in any case, the liquid mass is in practical equilibrium with the cocoa-butter crystallites at the temperatures considered. However, keeping the composition too long under agitation before putting it to use is undesirable since a prolonged agitation impairs the tropicalization phenomenon, perhaps because the network mentioned before is broken. Subjecting the composition of the invention to temperature above 30° C. for any substantial length of time should also be avoided because this also destroys the tropicalization effect. This is probably due to a fast melting of the emulsion solid particles, re-distribution of the water in the mass and the premature formation of a hydrophilic phase wich is undesirable at this stage because of its viscosity which is very high. It is quite possible that, in this case, the physical conditions are similar to that of having water directly incorporated into the chocolate mixture as in the prior-art, e.g. Swiss Pat. No. 409.603. Hence, regarding this aspect of the question, the temperature should be watched carefully right after adding the emulsion to the mass since there was noticed, at that time, a sudden significant jump in temperature (heat evolution) which may need to be controlled by cooling.

PREFERRED CONDITIONS FOR ACHIEVING THE INVENTION

The water droplets of the emulsiion of water in fat which is used in the above-mentioned preparation can be of any size. Preferably, the water droplets thereof have a size of about 0.1 to 100 $\mu$m. Preferably, the quantity of water relative to that of fat will be between 30 to 80%, but these values can be modified if necessary and are in no way critical. What is critical, by contrast, is that only an emulsion of "water in fat" can be used in the invention and not an emulsion of "fat in water", by opposition. This limitation is quite evident since the objective is to stabilize the emulsion once formed and to trap the water droplets wihin the fat long enough for the composition to be put to work, i.e. to be cast definitively, all this before the water has the opportunity to bind with the non fat bodies of the chocolate. Also, there should be avoided, when preparing the emulsion, too high water-to-fat ratios as, in such cases, it may become difficult to achieve a good emulsion. On the other hand, using too low water-to-fat ratios sould also be avoided since, in such cases, the amount of emulsion to be added to the mass of liquid chocolate for achieving a given proporation of water therein might become too large, thus supplying to the composition a quantity of fat which is exaggerated and incompatible with the manufacture of a chocolate of good quality. Furthermore, too much fat in the chocolate could harm the tropicalization efficacy. In this connection, it should be remarked that according to some references, adding a water-oil emulsion to the chocolate will impart fluidity thereto which appears to contradict the observation on which the present invention is based (see for instance French Pat. Nos. 1.099.864 and 2.021.299). It can consequently be assumed that in said references the emulsions mentioned rather refer to "oil-in-water" emulsion types rather than the "water-in-oil" emulsion types used here. Incidently, it should also be mentioned that in Dutch Pat. No. 82.891, there is reported that "water-in-oil" emulsions are usable in the manufacture of cosmetics and food-produtcs, e.g. chocolate. Tropicalized chocolate is however not mentioned in this reference.

The amount of water which is added in the present invention relative to the total of the composition is in the order of 1 to 4% by weight. Lower levels do not have much practical effect and higher levels may undesirably raise the viscosity of the tempered chocolate mass before casting and may, possibly, impart to the chocolate a grainy structure as compared to that of ordinary chocolate, which is a thing that one wants normally to avoid. Of course, if it is desired to willingly obtain a chocolate with a texture different from that of ordinary chocolate, then one can add more than 4% of water.

As the fat of the present emulsion, cocoa-butter can be used preferentially but other fatty substances known in the manufacture of chocolate can also be used.

The emulsion "water-in-fat" required for achieving the invention can be obtained as follows: first, the selected quantity of water is emulsified within the fat body. For this, the water is added to the fluidized fat under violent agitation in an emulsifying apparatus. The term "fluidized fat" or "fluidized fat substance" used here defines a condition whereby the fat is liquid like but not necessarily completely melted because, if this were so, the emulsion would be more difficult to obtain and would also be less stable. Therefore, it is highly preferable that the fatty phase in the fluid state should contain, as a dispersion therein, a certain proportion of solidified fat in equilibrium with the liquid, such solid fraction being obtained, as is the case when subjecting chocolate to tempering, by a controlled temporary cooling of the fully molten fatty substance. The amount of fat in solid form in the water-in-fat emulsion as a result of tempering the chocolate is at least 20%.

Once the emulsion is obtained, it can be made to acquire the consistency of a rather thick cream such that the emulsified water droplets be well embedded in the solid fat, this being so for avoiding too fast a binding of the water, when added to the chocolate, with the non fatty solids thereof and the tropicalization to be premature.

Otherwise, as a modification, the emulsion can be cooled, for instance around 10° C., so that it acquires a solid crystalline structure. The solid emulsion block thus obtained is then ground into a powder by usual means, e.g. by milling or grinding. This powder can be stored before use for a prolonged period and can be supplied to potential users who wish to manufacture tropicalized chocolate.

Whichever, the form of the "water-in-fat" emulsion, the latter is added to the mass of conged chocolate (tempered or not tempered previously) for preparing the composition according to the invention and it is rapidly dispersed therein.

The composition thus obtained can be used for casting chocolate articles or for coating confectionery sweets or other foodstuffs (e.g. cookies, etc..). The techniques required for this working are absolutely identical with that normally used for ordinary tempered chocolate compositions. For instance, the composition is poured into molds and allowed to cool slowly. For doing this, and for the other applications (coating, decorating) there exists many automatic machines which are well suitable. It is only essential that the composition of the invention should not be kept unused for too long in the liquid state.

The articles of chocolate obtained from the composition of the invention are, after solidification, perfectly tropicalized and will resist, without noticeable alteration, several weeks of storage at a temperature of 40°–50° C. (average) and even more, the only harm due to prolonged storage at a high temperature being a slight loss of the original gloss. It should be noted that the tropicalization effect obtained according to the invention amplifies itself with time. It reaches a stable maximum after about 2 weeks at 15°–20° C. or after one to two days at 27°–28° C.

The following examples illustrate the invention:

EXAMPLE 1

(a) Preparation of an emulsion of water in a fatty material

In a container provided with a stirrer, 1 kg of cocoa-butter was melted by heating to 50° C. Then, the liquid was tempered by cooling to 26° and keeping such temperature until it became milky due to the crystallization of the less fusible portions of the fat, i.e. formation of "crystallization germs". Then, it was brought to 29°–31° C. in order to avoid its complete solidification, the milky liquid being in some kind of equilibrium at this temperature. The tempered cocoa-butter at this temperature had at least 20% of the fat in solid form.

The liquid was placed into a high-speed emulsifier of the "mixer" type and, while violently stirring at approximately 30° C. there was added 1–2 g of soy lecithin and one liter of water. Mixing was continued until the desired emulsion was formed which had the aspect of a mellow cream between 29° and 31° C. The cream was cast into a mold at room temperature, slightly shake to remove air bubbles and allowed to stand for 30 to 60 min at 10° C. After this period, the mass was in the form of a solid which could be lifted out of the mold and stored at room temperature.

After at least 24 hrs of storage, the block was milled or ground by usual means (in a milling or grinding machine), so as to obtain a powder of particles or chips of about 1 to 5 mm. This powder can be used for the next operations or it can be stored at 10°–20° C. for a prolonged period.

(b) Preparation of a tropicalized chocolate composition

In an appropriate container provided with a stirrer, there was placed 10 kg of a mass of milk chocolate of current commercial grade taken, from a conge, in liquid form. In the present Example, the milk-chocolate had the following constituents (by weight): fatty substances 32% (26% of cocoa-butter plus 6% of milk fats); skim milk solids 11%; non-fatty solids and other substances from cocoa 29%; sugars 27%; moisture 0.4–0.6%. The chocolate was liquid at 55° C. and, while stirring, it was subjected to a tempering operation, i.e. it was cooled to 26° C. to initiate the formation of cocoa-butter crystallites, then it was reheated to 29.5° C. In such condition, the mass was well fluidized. Still under agitation, there was then added in streaks (for 15–30 sec) 400 to 500 g of the solid powder of the water in cocoa-butter emulsion, the preparation of which has been described above. Agitation was continued for a few minutes to ensure that the distribution of the powder is homogeneous and the whole was kept under these conditions until it was time to use the composition. It should be noted that although the powder is present in the mass under liquid-solid equilibrium conditions, and although in the presence of cocoa-butter crystallites it has no particular tendency to melt rapidly, it should be put rapidly into use because its stability is time limited (15–30 min approximately). It should also be noted that it is important to correctly order the steps of the procedure as described above. If tempering the chocolate mass has not been carried out before adding the emulsion, this should preferably be omitted. Indeed, if the solid emulsion powder is added at 29°-31° C. to the chocolate mass before tempering and the tempering operation is carried out afterwards, the tropicalization effect on the chocolate is strongly decreased, if not lost completely. Also, heating the present composition, before its put to work, at temperatures exceeding about 31°-32° C. should be avoided to prevent loss of the tropicalization effect.

(c) Putting the tropicalized chocolate composition into use

Without further delay, the above liquid composition was cast into molds for molding chocolate bars and the whole was allowed to cool slowly according to usual techniques. After about one night, the bars were lifted and it was noted that the aspeces of the chocolate were identical with a control chocolate that was prepared under the same conditions and from the same conged mixture, except for the above tropicalization treatment.

The tropicalized chocolate and the control chocolate were submitted to a group of experienced testers who could not detect appreciable differences between the two types of chocolate.

(d) Heat resistance tests

1. Several samples of chocolate cast from the above described composition and corresponding controls of identical overall compositions, but having not been subjected to the tropicalization treatment, were heated for 1-2 hrs at 40° C. in an appropriate oven. Then, the samples were subjected to a "penetration" test which consists of placing on the surface of the sample a piercing device with a vertical needle on which a progressive force is applied until a standard penetration into the chocolate (in this case, 3 mm) is achieved. For the control chocolate an average force of 6 g was measured whereas on the same chocolate, but tropicalized, an average force of 58 g was measured.

2. Samples of tropicalized chocolate and controls were kept overnight at 50° C. in an oven. The samples under test were examined and showed no sign of appreciable deterioration. For instance, the bars still broke giving neat pieces as if the temperature was not over 15°-20° C. In contrast, the controls had a doughy look and had collapsed completely.

3. Packed tropicalized chocolate bars were stored in the trunk of an automobile which travelled for 15 days during the summertime, the car staying many times in full sunshine in parking lots. After this treatment, the chocolate was examined and only a slight loss in shine and gloss was noticed. The chocolate body was not distorted and had no "fat bloom" deposit.

It must be noted that the chocolate thus tropicalized does not easily return to its structure of ordinary non-tropicalized chocolate. This can however be achieved by lengthily crushing and mixing the tropicalized chocolate at a temperature of 50°-55° C. The water slowly evaporates and the mass comes back then to the prime state of liquid chocolate analogous to that chocolate taken right out of the conge; from this state, it can be tropicalized again if desired.

It should also be noted that if, in the chocolate used in the present Example, there is added, after tempering, a quantity of free water of approximately 2 to 3% by weight (this amount is what is added according to the invention), the increse in viscosity of the mass is such that it cannot be kneaded any more and, more importantly, it cannot be cast into molds.

If, in the present Example, the tempering step is omitted, i.e. if the 10 kg chocolate mass just withdrawn from the conge is simple brought to about 30° C. and the powder of solid emulsion of water in cocoa-butter is added, the tropicalization effect is about the same and the quality (taste and structure) of the obtained tropicalized product is practically not impaired. Presumably, the small particles of the powdered emulsion act, when added to the liquid chocolate, somewhat as if they were the crystallization germs normally formed by tempering.

EXAMPLE 2

A known commercial grade of chocolate (fats 32%, nonfat solids 18%, sugars 50% (all by weight), no milk) was selected and 10 kg thereof was taken out of a conge and treted with 400 g of an emulsion of water in cocoa-butter ($H_2O$ 50% by weight) exactly as described in the previous Example. After casting chocolate articles with the tropicalized composition, samples were subjected to the "penetration" test mentioned heretofore and an average value of 16.3 g was found at 40° C. (6 g for the controls).

EXAMPLE 3

In a stirred container, there was liquefied at 50° C. one kg of cocoa-butter. Then, it was tempered at 26° C. and, after further heating to 29°-30° C., there was emulsified in the milky mass one liter of water in the presence of a small amount of lecithin, all being in accordance with the description under part (a) of Example 1. As in Example 1(a) and due to the fact that the cocoa-butter was tempered to 26° C. and then raised to 29°-30° C., at least 20% of the fat in the tempered cocoa-butter and the resulting water-in-fat emulsion prepared from the tempered cocoa-butter was in solid form. Agitation was continued while the temperature was slightly lowered until a mellow cream was obtained which was then added with stirring to 10 kg of a liquid mass of conged chocolate as described in part (b) of Example 1. Then, when the mass was well homogenized, it was cast into molds for molding chocolate articles and it was allowed to rest overnight at 10°-15° C. The cast articles were then lifted, out were packed according to usual practice and the wrapped products were stored for 48 hrs at 27° C. to optimize the tropicalization state. The articles thus tropicalized behaved very similarly to that described in Example 1.

We claim:

1. A chocolate composition for use in the preparation of a heat-resistant chocolate article comprising a chocolate mass containing cocoa butter, sugar, milk solids and cocoa solids, and dispersed throughout the mass, from 2 to 10% by weight of the composition of a water-in-fat emulsion, at least 20% of the fat being in solid form.

2. The composition of claim 1 in which the water-in-fat emulsion contains from 30 to 80% by weight of water relative to the amount of fat.

3. The composition of claim 2 in which the water-in-fat emulsion is an emulsion of water in cocoa butter.

4. The composition of claim 3 in which the water-in-fat emulsion contains approximately 1 liter of water per kilogram of cocoa butter.

5. The composition of claim 1 wherein the emulsion is in the form of solid particles.

6. The composition of claim 5 wherein the size of the particles is from about 1 to 5 mm.

7. The composition of claim 1 the emulsion is in the form of fluid cream, the portion of the fat in solid form being dispersed throughout the rest of the fat in liquid form.

8. The composition of claim 1 wherein the size of the droplets of the water in the emulsion is from about 0.1 to 100 microns.

9. A shaped, heat-resistant chocolate article containing the chocolate composition of claim 1.

10. A method for the preparation of a chocolate composition for use in the manufacture of heat-resistant chocolate articles which comprises forming a liquid chocolate mass of cocoa butter, sugar, milk solids and cocoa solids, and thereafter dispersing throughout the mass from 2 to 10% by weight, based on the weight of the total composition, of an emulsion of a water-in-fat, at least 20% of the fat being in solid form.

11. The method of claim 10 wherein the emulsion is an emulsion of water in cocoa butter.

12. The method of claim 10 including tempering of the liquid chocolate mass to generate cocoa-butter crystallites within the mass prior to dispersing the water-in-fat emulsion in the mass.

13. The method of claim 12 wherein the emulsion is incorporated into the fluid mass of chocolate at a temperature of from 26° to 31° C.

14. The method of claim 10 wherein the emulsion is in the form of solid particles.

15. The method of claim 14 wherein solid emulsion particles are obtained by fluidizing the fat, emulsifying water in the fluidized fat, cooling the emulsification until the fat substance crystallizes into a solid and then grinding the crystallized solid into particles.

16. The method of claim 10 wherein the emulsion is in the form of fluid cream, the portion of the fat in solid form being dispersed throughout the rest of the fat in liquid form.

17. The method of claim 16 wherein the cream is obtained by fluidizing the fat and then emulsifying water into the fat until a cream is obtained.

* * * * *